United States Patent
Inaba

(10) Patent No.: US 10,401,706 B2
(45) Date of Patent: Sep. 3, 2019

(54) DIGITAL CAMERA

(71) Applicant: Minoru Inaba, Oyama (JP)

(72) Inventor: Minoru Inaba, Oyama (JP)

( * ) Notice: Subject to any disclaimer, the term of this patent is extended or adjusted under 35 U.S.C. 154(b) by 27 days.

(21) Appl. No.: 15/745,470

(22) PCT Filed: Jul. 11, 2016

(86) PCT No.: PCT/JP2016/070385
§ 371 (c)(1),
(2) Date: Jan. 17, 2018

(87) PCT Pub. No.: WO2017/018183
PCT Pub. Date: Feb. 2, 2017

(65) Prior Publication Data
US 2018/0210316 A1  Jul. 26, 2018

(30) Foreign Application Priority Data

Jul. 24, 2015 (JP) .................................. 2015-146387

(51) Int. Cl.
*G03B 13/02* (2006.01)
*G03B 13/06* (2006.01)
(Continued)

(52) U.S. Cl.
CPC ............. *G03B 13/06* (2013.01); *G03B 13/02* (2013.01); *G03B 17/04* (2013.01); *H04N 5/2253* (2013.01);
(Continued)

(58) Field of Classification Search
CPC .................................. G03B 13/06; G03B 17/04
See application file for complete search history.

(56) References Cited

U.S. PATENT DOCUMENTS 4,389,675 A * 6/1983 Suzuki ............... H04N 5/23293
348/341
4,682,240 A * 7/1987 Bachmann ........... H04N 5/2251
348/333.06
(Continued)

FOREIGN PATENT DOCUMENTS

JP  H09-312821  12/1997
JP  2005-333174  12/2005
(Continued)

OTHER PUBLICATIONS

International Search report dated Aug. 30, 2016 in PCT/JP2016/070385; 4 pages, with English translation.

*Primary Examiner* — Clayton E. LaBalle
*Assistant Examiner* — Linda B Smith
(74) *Attorney, Agent, or Firm* — Fattibene and Fattibene LLC; Paul A. Fattibene

(57) ABSTRACT

To provide a digital camera that allows an imaged image to be easily checked by peeking through an electronic view finder regardless of the vertical and horizontal orientation of the digital camera when taking a photograph from a low angle. A digital camera 1 includes a camera main body 2 with an imaging lens 2a, and an electronic view finder 3 that allows a user to observe the image imaged by the imaging lens 2a. The electronic view finder 3 includes an image display part 4 that displays the imaged image, a pivot bracket 5 that supports the image display part 4 so as to be rotatable about an axis A, and a fixed bracket 6 that couples the camera main body 2 and the pivot bracket 5, and that supports the pivot bracket 5 so as to be rotatable about an axis B.

2 Claims, 8 Drawing Sheets

(51) Int. Cl.
*G03B 17/04* (2006.01)
*H04N 5/225* (2006.01)
*H04N 5/232* (2006.01)

(52) U.S. Cl.
CPC ... *H04N 5/225251* (2018.08); *H04N 5/23293* (2013.01)

(56) References Cited

U.S. PATENT DOCUMENTS

| | | | |
|---|---|---|---|
| 7,916,211 B2 * | 3/2011 | Okudaira | H04N 5/2251 348/333.06 |
| 2009/0256956 A1 * | 10/2009 | Furuhashi | H04N 5/2251 348/376 |

FOREIGN PATENT DOCUMENTS

| | | |
|---|---|---|
| JP | 2006-135433 | 5/2006 |
| JP | 2014-206626 | 10/2014 |

* cited by examiner

DIGITAL CAMERA

TECHNICAL FIELD

The present invention relates to digital cameras, and in particular, to a digital camera that can freely rotate an electronic view finder vertically and horizontally.

BACKGROUND ART

Conventionally, in a digital camera, a camera is rotated with an optical axis of a photographing lens as a center according to size, orientation, and the like of a subject to photograph a vertical screen position and a horizontal screen position accordingly.

However, when directing the photographing lens of the camera to a position close to a horizontal direction to take a photograph at an extremely low position, or in a so-called low angle photography, problems arise in that one needs to lie on the ground or to attach a 90 degrees conversion prism or a reflecting mirror to a finder.

In a digital camera in which a displaying display is arranged on a back surface of a camera main body, however, the user takes a photograph while visually recognizing an imaged image on the displaying display. Furthermore, in areas where the displaying display is difficult to visually recognize such as outdoors, it is typical to check the imaged image through the electronic view finder.

Patent document 1 discloses a digital camera including an electronic view finder that is rotatable about a rotation axis perpendicular to a variable angle monitor. The variable angle monitor of patent document 1 is attached to a camera main body by way of a hinge part, and is rotatable about a first rotation axis and a third rotation axis. The electronic view finder is attached so as to be rotatable about a second rotation axis to an end of the variable angle monitor.

PRIOR ART DOCUMENT

Patent Document

Patent document 1: Japanese Laid-Open Patent Publication No. 2014-206626

DISCLOSURE OF THE INVENTION

Problems to be Solved by the Invention

However, the digital camera described above has a problem in that the work for moving the electronic view finder to a desired position is cumbersome as the electronic view finder rotates about the first to third rotation axes in cooperation with the variable angle monitor.

Thus, when taking a photograph from a low angle, a technical problem that needs to be resolved arises in order to easily check the imaged image by peeking through the electronic view finder regardless of the vertical or horizontal orientation of the digital camera, and it is an object of the present invention to solve such problem.

Means for Solving the Problem

The present invention is provided to achieve the object described above, wherein the invention according to an embodiment provides a digital camera including a camera main body with an imaging lens, and an electronic view finder for a user to observe an image imaged by the imaging lens; where the electronic view finder includes an image display part that displays the imaged image, a pivot bracket that supports the image display part so as to be rotatable about a first rotation axis, and a fixed bracket that couples the camera main body and the pivot bracket, and that supports the pivot bracket so as to be rotatable about a second rotation axis perpendicular to the first rotation axis.

According to such a configuration, the image display part can be arbitrarily rotated about the first rotation axis or the second rotation axis. In other words, the image display part can be turned about the first rotation axis when the image display part relatively rotates with respect to the pivot bracket. Furthermore, the image display part can be turned about the second rotation axis when the pivot bracket relatively rotates with respect to the fixed bracket.

The invention according to another embodiment provides, in addition to the configuration of the digital camera according to a prior embodiment, the digital camera that further includes a simultaneous rotation regulating mechanism that regulates simultaneous rotation of the image display part and the pivot bracket.

According to such a configuration, as the simultaneous rotation regulating mechanism regulates the image display part from simultaneously rotating about the first rotation axis and the second rotation axis, the image display part is rotated about the desired rotation axis of the user, whereby the position adjustment of the image display part can be easily carried out.

The invention according to another embodiment provides, in addition to the configuration of the digital camera according to a prior embodiment, the digital camera in which where the simultaneous rotation regulating mechanism is configured by a fit-in portion arranged on an opposite side of an eye lens of the image display part with the first rotation axis in between, and a recess that is formed by cutting out one part of the fixed bracket, and into which the fit-in portion is fitted when the image display part is rotated about the first rotation axis.

According to such a configuration, the pivot bracket is regulated from relatively rotating with respect to the fixed bracket when the fit-in portion is fitted into the recess, and hence the image display part is suppressed from also further rotating about the second rotation axis while being rotated about the first rotation axis.

The invention according to another embodiment provides, in addition to the configuration of the digital camera according to a prior embodiment, the digital camera that further includes an excess rotation regulating mechanism that regulates a rotation range of the pivot bracket about the second rotation axis.

According to such a configuration, as the excess rotation regulating mechanism regulates the rotation range of the pivot bracket, the excessive rotation of the image display part is suppressed, whereby the position adjustment of the image display part can be easily carried out.

The invention according to another embodiment provides, in addition to the configuration of the digital camera according to a prior embodiment, the digital camera in which the excess rotation regulating mechanism is configured by a fan shaped stopper groove formed in either one of the pivot bracket or the fixed bracket, and a stopper pin that is attached to the other one of the pivot bracket or the fixed bracket and that is fitted into the stopper groove.

According to such a configuration, the rotation range of the pivot bracket is limited to a range the stopper pin can move within the stopper groove, and thus the excessive rotation of the image display part is suppressed and the position adjustment of the image display part can be easily carried out.

Effects of the Invention

According to the present invention, when the image display part is relatively rotated with respect to the pivot bracket, the image display part can be turned about the first rotation axis. Furthermore, when the pivot bracket is relatively rotated with respect to the fixed bracket, the image display part can be turned about the second rotation axis.

BEST MODE FOR CARRYING OUT THE INVENTION

In order to achieve the object of allowing an imaged image to be easily checked by peeking through an electronic view finder regardless of the vertical and horizontal orientation of the digital camera when taking a photograph from a low angle, the present invention provides a digital camera including a camera main body with an imaging lens, and an electronic view finder for a user to observe an image imaged by the imaging lens; wherein the electronic view finder includes an image display part that displays the imaged image, a pivot bracket that supports the image display part so as to be rotatable about a first rotation axis, and a fixed bracket that couples the camera main body and the pivot bracket, and that supports the pivot bracket so as to be rotatable about a second rotation axis perpendicular to the first rotation axis.

Example

Figure 1:
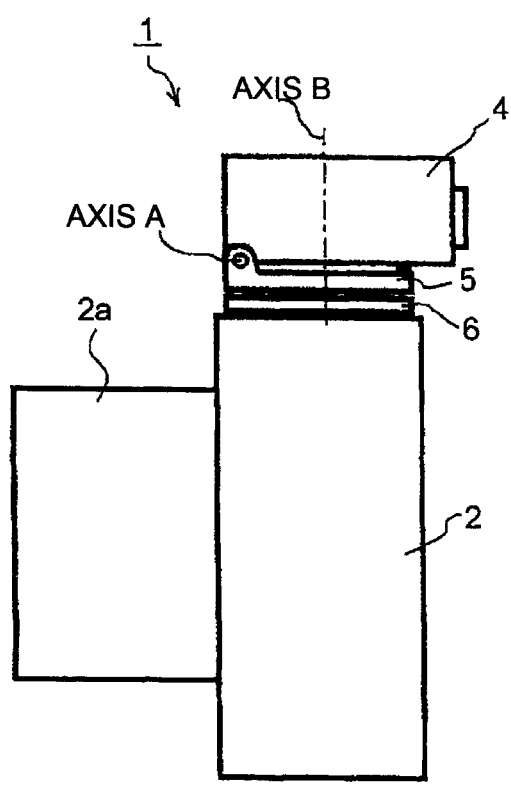
FIG. 1 is a front view showing a digital camera according to one example of the present invention.
Figure 2:
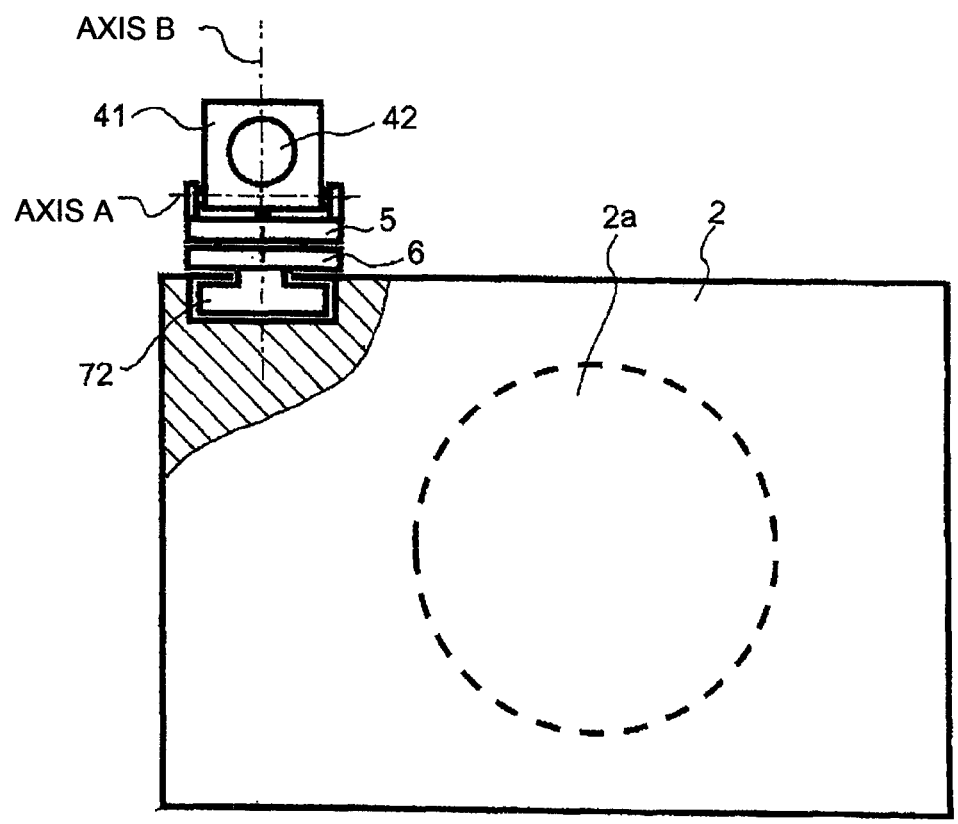
FIG. 2 is a partially cutout side view of the digital camera of FIG. 1.
Figure 3:
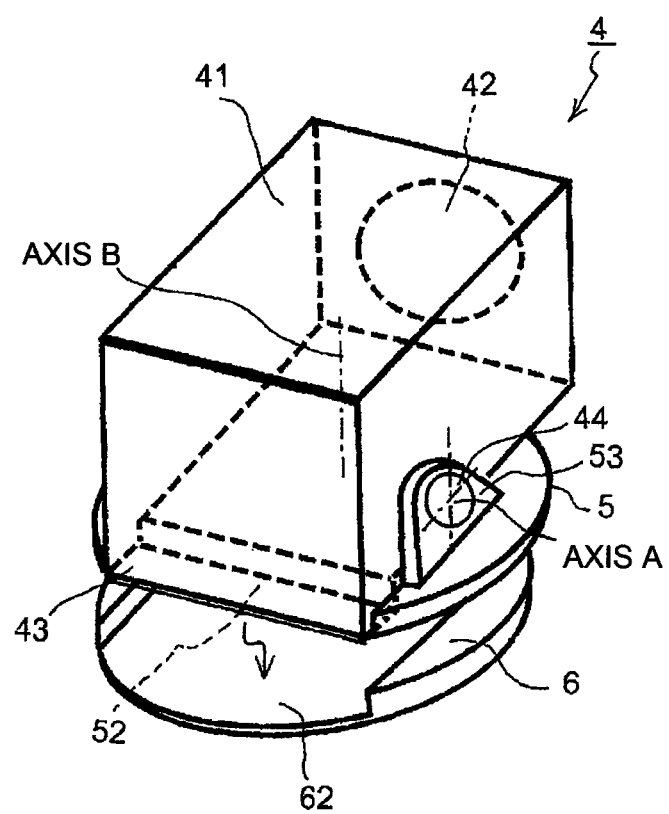
FIG. 3 is an assembled exploded view showing an electronic view finder.
Figure 4:
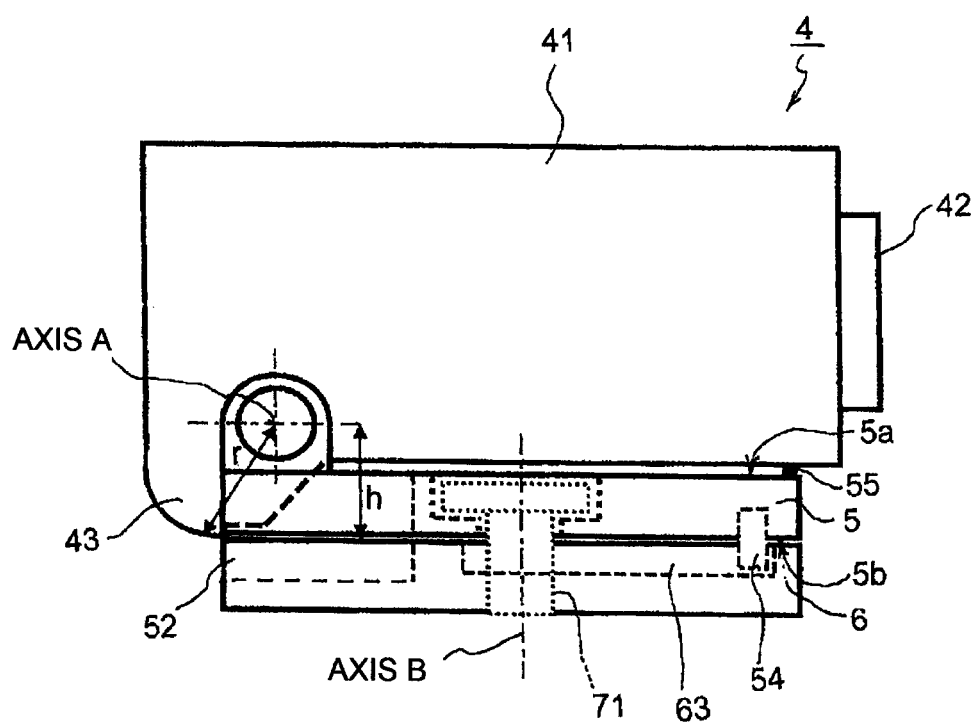
FIG. 4 is a front view showing the electronic view finder.
Figure 5:
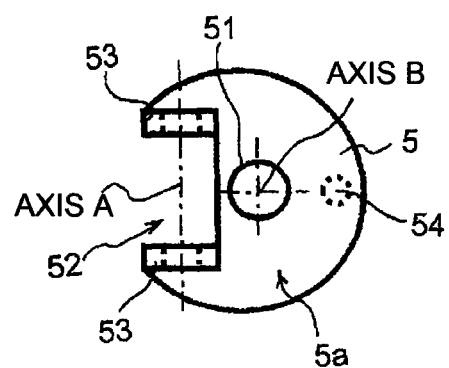
FIG. 5 is a plan view showing a pivot bracket of FIG. 4.
Figure 6:
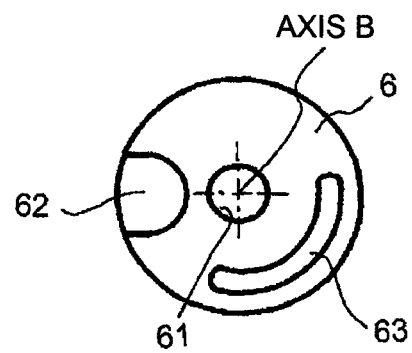
FIG. 6 is a plan view showing a fixed bracket of FIG. 4.

Hereinafter, a digital camera 1 according to one example of the present invention will be described according to the drawings. FIG. 1 is a front view showing a digital camera 1. FIG. 2 is a partially cutout side view of the digital camera 1. FIG. 3 is an assembled exploded view showing an electronic view finder 3. FIG. 4 is a front view showing the electronic view finder 3. FIG. 5 is a plan view showing a pivot bracket 5. FIG. 6 is a plan view showing a fixed bracket 6. In the present example, a rotation axis for rotating an image display part 4, to be described later, with respect to the pivot bracket 5 is assumed as an axis A serving as a first rotation axis, and a rotation axis for rotating the pivot bracket 5 with respect to the fixed bracket 6 is assumed as an axis B serving as a second rotation axis.

As shown in FIGS. 1 and 2, the digital camera 1 according to the present example includes a camera main body 2 with an imaging lens 2a, an electronic display (not shown) that displays the image imaged by the imaging lens 2a, and the electronic view finder 3. The electronic display is a liquid crystal display, an organic EL display, and the like.

The electronic view finder 3 includes an image display part 4 that displays the imaged image. The image display part 4 uses a display element such as, for example, ferroelectric reflective liquid crystal (LCOS), high temperature polysilicon TFT liquid crystal (HTPS), and the like. Such display element is a micro-miniature but high pixel and high-definition element, and is suited for a micro-miniature video display element having a large aperture ratio. Furthermore, such display element excels in visibility in dark places and can display the imaged image in an enlarged manner, as needed, compared to an optical finder.

The image display part 4 is attached to the camera main body 2 by way of the pivot bracket 5 and the fixed bracket 6. The pivot bracket 5 and the fixed bracket 6 are coaxially positioned by way of a screw 71 and a nut 72. The image display part 4 includes a housing 41, an observation window 42, a fit-in portion 43, and a shaft portion 44. The housing 41 stores the display element described above. The observation window 42 is provided for the user to look through when visually recognizing the imaged image, where an eye lens is arranged thereat. The fit-in portion 43 constitutes one part of the housing 41, and is located on an opposite side of the observation window 42 with the axis A in between. The shaft portion 44 is arranged to project out from both side surfaces of the housing 41 so as to coincide with the axis A, and is engaged with and supported by a shaft supporting portion 53 of the pivot bracket 5, to be described later. A radius of rotation r from the center of the axis A to a distal end of the fit-in portion 43 is set to be greater than a height h of the axis B.

The pivot bracket 5 is formed to a D-shape in plan view. A hole 51, through which the screw 71 is inserted, is formed at the center of the pivot bracket 5. A rectangular cutout portion 52 is formed at one part of the pivot bracket 5. The shaft supporting portion 53 is arranged in an upright manner at both ends of the cutout portion 52 on a front surface 5a of the pivot bracket 5. A stopper pin 54 is arranged in an upright manner on a back surface 5b of the pivot bracket 5. Reference numeral 55 is denoted on a buffer rubber that receives the image display part 4.

The fixed bracket 6 is formed to a circular plate shape in plan view. A hole 61, through which the screw 71 is inserted, is formed at the center of the fixed bracket 6. A recess 62 is formed in the fixed bracket 6. A stopper groove 63 formed to a fan shape with a center angle of about 90° is formed in the fixed bracket 6. The fixed bracket 6 is securely attached to the camera main body 2 through the screw 71.

A simultaneous rotation regulating mechanism 8 is configured by the fit-in portion 43 and the recess 62. A specific operation of the simultaneous rotation regulating mechanism 8 will be described later.

An excess rotation regulating mechanism 9 is configured by the stopper pin 54 and the stopper groove 63. The stopper pin 54 moves within the stopper groove 63 according to the rotating operation of the pivot bracket 5, and the rotating operation of the pivot bracket 5 is regulated when the stopper pin 54 makes contact with the end of the stopper groove 63. Specifically, one end of the stopper groove 63 is positioned so that the stopper pin 54 stops while being located on the right side of the plane of drawing of FIG. 6 with respect to the axis B, for example, and the other end of the stopper groove 63 is positioned so that the stopper pin 54 stops with the stopper pin 54 fitted into the stopper groove 63 located on the lower side of the plane of drawing of FIG. 6 with respect to the axis B. Therefore, a moving range of the stopper pin 54 is limited to approximately 90° in plan view. The configuration of the excess rotation regulating mechanism 9 is not limited to the above, and the stopper pin 54 may be arranged on the fixed bracket 6, and the stopper groove 63 may be formed in the pivot bracket 5.

Figure 7:
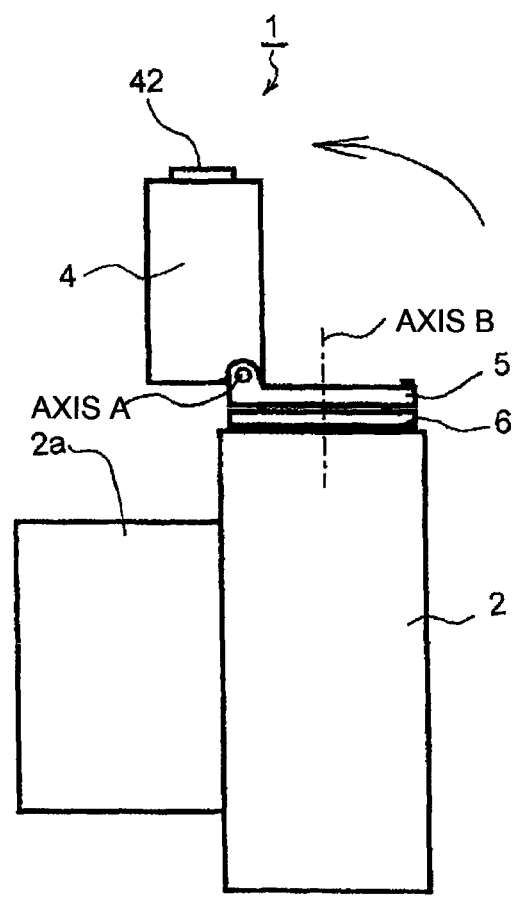
FIG. 7 is a front view showing a state in which an image display part of FIG. 1 is rotated about a first rotation axis.
Figure 8:
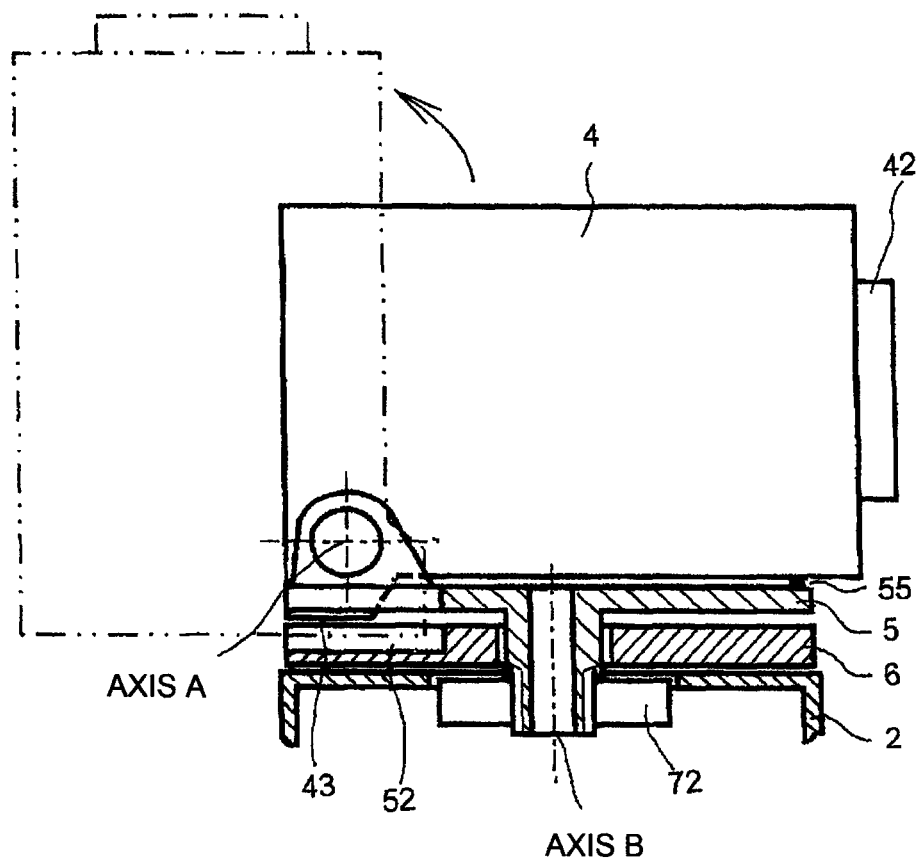
FIG. 8 is a partially cutout front view showing an electronic view finder in a state the image display part is rotated about the first rotation axis.
Figure 9:
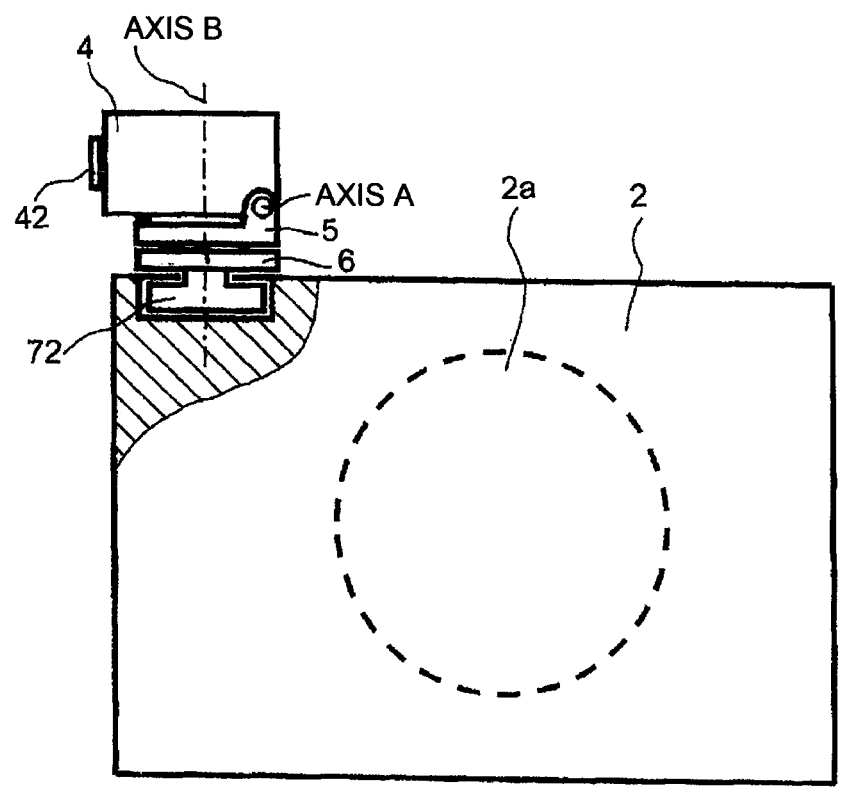
FIG. 9 is a partially cutout side view showing a state in which the image display part of FIG. 2 is rotated about a second rotation axis.

The operation of the simultaneous rotation regulating mechanism 8 will now be described based on the drawings. Hereinafter, as shown in FIG. 1, a state in which the optical axis of the electronic view finder 3 and the optical axis of the imaging lens 2a are parallel is referred to as an "initial position". FIG. 7 is a front view showing a state in which the image display part 4 of FIG. 1 is rotated about 90° about the axis A. FIG. 8 is a partially cutout front view showing the electronic view finder 3 in a state the image display part 4 is rotated about the axis A. FIG. 9 is a partially cutout side view showing a state in which the image display part 4 of FIG. 2 is rotated about 90° about the axis B.

When the image display part 4 starts to rotate about the axis A from the initial position, the fit-in portion 43 is fitted into the cutout portion 52 and the recess 62. As shown in FIGS. 7 and 8, when the image display part 4 is rotated 90° about the axis A, the distal camera 1 corresponds to a horizontal screen position. Furthermore, as the fit-in portion 43 passes the cutout portion 52 and enters the recess 62, the relative rotation of the pivot bracket 5 and the fixed bracket 6 is interfered and regulated by the fit-in portion 43, whereby the pivot bracket 5 is regulated from further rotating about the axis B with the image display part 4 rotated about the axis A. In FIG. 8, the pivot bracket 5 and the screw 71 are integrated. Thus, the center of the axis B can be made hollow and an electric wiring can be passes therein.

When the pivot bracket 5 starts to rotate about the axis B from the initial position, the stopper pin 54 slides within the stopper groove 63. As shown in FIG. 9, when the pivot bracket 5 is rotated about 90° about the axis B, the stopper pin 54 comes into contact with the end of the stopper groove 63, whereby further rotation of the pivot bracket 5 is regulated. When the pivot bracket 5 is rotated about the axis B, the digital camera 1 corresponds to a vertical screen position. The pivot bracket 5 is eventually able to pivot about 90°. Furthermore, when the pivot bracket 5 relatively rotates with respect to the fixed bracket 6, the fit-in portion 43 cannot enter the recess 62, and hence the image display part 4 is regulated from further rotating about the axis A with the pivot bracket 5 rotated about the axis B.

As described above, in the digital camera 1 according to the present example, the image display part 4 can be turned about the axis A as the image display part 4 relatively rotates with respect to the pivot bracket 5. Furthermore, the image display part 4 can be turned about the axis B as the pivot bracket 5 relatively rotates with respect to the fixed bracket 6.

Moreover, as the simultaneous rotation regulating mechanism 8 regulates the image display part 4 from simultaneously rotating about the axis A and the axis B, the image display part 4 is rotated about the desired rotation axis of the user, whereby the position adjustment of the image display part 4 can be easily carried out.

Furthermore, as the excess rotation regulating mechanism 9 regulates the rotation range of the pivot bracket 5, the excessive rotation of the image display part 4 is suppressed, whereby the position adjustment of the image display part 4 can be easily carried out.

In the example described above, the image display part 4 is rotated about the axis A parallel to a longitudinal direction of the camera main body 2, and the pivot bracket 5 is rotated about the axis B parallel to a short direction of the camera main body 2, but a structure in which the image display part 2 is rotated about the axis B and the pivot bracket 5 is rotated about the axis A may be adopted.

The rotation angle of the image display part and the pivot bracket is not limited to 90 degrees, and may be, for example, 80 degrees or 100 degrees.

The present invention may be modified to many other forms without departing from the spirit of the invention, and it should be recognized that the present invention includes all such modifications.

DESCRIPTION OF SYMBOLS 1 digital camera
2 camera main body
2a imaging lens
3 electronic view finder
4 image display part
41 housing
42 observation window
43 fit-in portion
44 shaft portion
5 pivot bracket
51 hole (of pivot bracket)
52 cutout portion
53 shaft supporting portion
54 stopper pin
6 fixed bracket
61 hole (of fixed bracket)
62 recess
63 stopper groove
71 screw
72 nut
8 simultaneous rotation regulating mechanism
9 excess rotation regulating mechanism

What is claimed is:
1. A digital camera comprising a camera main body with an imaging lens, and an electronic view finder for a user to observe an image imaged by the imaging lens; wherein
    the electronic view finder includes,
        an image display part that displays the imaged image,
        a pivot bracket that supports the image display part so as to be rotatable about a first rotation axis,
        a fixed bracket that couples the camera main body and the pivot bracket, and that supports the pivot bracket so as to be rotatable about a second rotation axis perpendicular to the first rotation axis, and
    a simultaneous rotation regulating mechanism that regulates simultaneous rotation of the image display part and the pivot bracket,
    wherein the simultaneous rotation regulating mechanism is configured by,
    a fit-in portion arranged on an opposite side of an eye lens of the image display part with the first rotation axis in between, and
    a recess that is formed by cutting out one part of the fixed bracket, and into which the fit-in portion is fitted when the image display part is rotated about the first rotation axis.

2. A digital camera comprising a camera main body with an imaging lens, and an electronic view finder for a user to observe an image imaged by the imaging lens; wherein
the electronic view finder includes,
an image display part that displays the imaged image,
a pivot bracket that supports the image display part so as to be rotatable about a first rotation axis,
a fixed bracket that couples the camera main body and the pivot bracket, and that supports the pivot bracket so as to be rotatable about a second rotation axis perpendicular to the first rotation axis, and
an excess rotation regulating mechanism that regulates a rotation range of the pivot bracket about the second rotation axis,
wherein the excess rotation regulating mechanism is configured by,
a fan shaped stopper groove formed in either one of the pivot bracket or the fixed bracket, and
a stopper pin that is attached to the other one of the pivot bracket or the fixed bracket and that is fitted into the stopper groove.

* * * * *